(12) United States Patent
Yan et al.

(10) Patent No.: US 12,335,106 B2
(45) Date of Patent: Jun. 17, 2025

(54) NETWORK PARAMETER CONFIGURATION METHOD AND APPARATUS, COMPUTER DEVICE, AND STORAGE MEDIUM

(71) Applicant: Huawei Technologies Co., Ltd., Shenzhen (CN)

(72) Inventors: Siyu Yan, Beijing (CN); Yinben Xia, Shenzhen (CN); Xiaolong Zheng, Beijing (CN); Weishan Deng, Beijing (CN); Zhigang Ji, Beijing (CN); Di Qu, Beijing (CN); Fuxing Chen, Boulogne Billancourt (FR)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/695,271

(22) Filed: Mar. 15, 2022

(65) Prior Publication Data

US 2022/0210026 A1 Jun. 30, 2022

Related U.S. Application Data

(63) Continuation of application No. PCT/CN2020/112599, filed on Aug. 31, 2020.

(30) Foreign Application Priority Data

Sep. 17, 2019 (CN) .......................... 201910878276.2

(51) Int. Cl.
*H04L 41/14* (2022.01)
*H04L 41/0816* (2022.01)
(Continued)

(52) U.S. Cl.
CPC ........ *H04L 41/145* (2013.01); *H04L 41/0816* (2013.01); *H04L 41/147* (2013.01); *H04L 43/062* (2013.01)

(58) Field of Classification Search
CPC . H04L 41/145; H04L 41/0816; H04L 41/147; H04L 43/062; H04L 47/283;
(Continued)

(56) References Cited

U.S. PATENT DOCUMENTS 10,873,533 B1 * 12/2020 Ismailsheriff ........... H04L 47/27
2007/0055477 A1 3/2007 Chickering et al.
(Continued)

FOREIGN PATENT DOCUMENTS

CN 106058851 A 10/2016
CN 108924127 A 11/2018
(Continued)

OTHER PUBLICATIONS

Yifei Lu et al., "Dynamic ECN marking threshold algorithm for TCP congestion control in data center networks", Computer Communications 129 (2018) 197 208, total 12 pages.
(Continued)

*Primary Examiner* — Fadi Haj Said
(74) *Attorney, Agent, or Firm* — Conley Rose, P.C.

(57) ABSTRACT

A network parameter configuration method, where in the method, network running data corresponding to a first period is input into a prediction model, so that the prediction model predicts, based on the input network running data, a value of a parameter of a network device in a second period, and the parameter of the network device in the second period is configured to the value predicted by the prediction model.

17 Claims, 11 Drawing Sheets

(51) Int. Cl.
*H04L 41/147* (2022.01)
*H04L 43/062* (2022.01)

(58) Field of Classification Search
CPC ......... H04L 47/29; H04L 47/30; H04L 47/33;
H04L 43/08; H04L 43/0852; H04L
43/0864; H04L 12/12; H04L 41/0823;
H04L 43/0876; H04L 43/0888; H04L
43/16; H04L 47/2483; H04L 12/2803;
G06N 5/01; G06N 20/20; G06N 3/088
See application file for complete search history.

(56) References Cited

U.S. PATENT DOCUMENTS

| | | | | |
|---|---|---|---|---|
| 2014/0064079 | A1* | 3/2014 | Kwan | ..................... H04L 47/30 370/234 |
| 2017/0076595 | A1 | 3/2017 | Macfarlane et al. | |
| 2017/0111233 | A1* | 4/2017 | Kokkula | ............. H04L 41/0823 |
| 2017/0366398 | A1* | 12/2017 | Mizrachi | ................. H04L 41/40 |
| 2018/0302296 | A1 | 10/2018 | Yu et al. | |
| 2019/0230009 | A1* | 7/2019 | Yousuf | .................... H04L 69/22 |
| 2019/0319881 | A1* | 10/2019 | Maskara | ................. H04L 47/72 |

FOREIGN PATENT DOCUMENTS

| | | |
|---|---|---|
| CN | 109417514 A | 3/2019 |
| CN | 109861925 A | 6/2019 |
| CN | 109873712 A | 6/2019 |
| CN | 110022264 A | 7/2019 |
| CN | 110061927 A | 7/2019 |
| CN | 110213784 A | 9/2019 |

OTHER PUBLICATIONS

Joy, S., et al., "SDN based ECN Adaptation Scheme for Improving Data Center Long Flow Throughput," IEEE ICC 2015-Workshop on Smart Communication Protocols and Algorithms (SCPA 2015), School of Electrical Engineering and Computer Science, University of Ottawa, Ottawa, Canada, Sep. 14, 2015, 6 pages.

* cited by examiner

Piecewise function: mapping from the packet quantity x to the first reward value

NETWORK PARAMETER CONFIGURATION METHOD AND APPARATUS, COMPUTER DEVICE, AND STORAGE MEDIUM

CROSS-REFERENCE TO RELATED APPLICATIONS

This is a continuation of International Patent Application No. PCT/CN2020/112599 filed on Aug. 31, 2020, which claims priority to Chinese Patent Application No. 201910878276.2 filed on Sep. 17, 2019. The disclosures of the aforementioned applications are hereby incorporated by reference in their entireties.

TECHNICAL FIELD

This application relates to the field of data transmission technologies, and in particular, to a network parameter configuration method and apparatus, a computer device, and a storage medium.

BACKGROUND

With widespread application of data centers, the data centers require a switching network to have characteristics such as a high throughput and a low latency. A switch in the switching network may properly configure a network parameter, and regulate packet forwarding based on the configured network parameter, to avoid network congestion during packet forwarding by the switch, so that the switching network can have the characteristics such as a high throughput and a low latency.

A process of configuring a network parameter may be as follows. For example, the network parameter is an Explicit Congestion Notification (ECN) parameter. The switch may configure the ECN parameter based on a configuration formula. The configuration formula may be: ECN parameter=$C_{out}$*Target_Rtt, $C_{out}$ is a throughput of a congested port of the switch, and Target_Rtt is a target end-to-end latency. Therefore, the switch may directly obtain the ECN parameter based on the configuration formula, and regulate packet forwarding based on the obtained ECN parameter, to avoid network congestion.

Target_Rtt in the configuration formula is a static parameter, and a value of Target_Rtt is affected by a packet transmission status. As a result, in some application scenario, an ECN parameter obtained by the switch based only on the configuration formula is not necessarily an optimal ECN parameter in the application scenario. Therefore, this configuration manner is not universal.

SUMMARY

Embodiments of this application provide a network parameter configuration method and apparatus, a computer device, and a storage medium, to improve universality of the network parameter configuration method.

According to a first aspect, a network parameter configuration method is provided. The method includes obtaining network running data corresponding to a first period, where the network running data includes at least one of a network transmission characteristic of a network device in the first period and a first value corresponding to a specified parameter, inputting the network running data into a prediction model, obtaining a second value, output by the prediction model based on the network running data, of the specified parameter, and configuring the specified parameter of the network device in a second period to the second value, where the second period is a period after the first period.

In the method, the network running data corresponding to the first period is input into the prediction model, so that the prediction model predicts, based on the input network running data, the value of the specified parameter of the network device in the second period, and the specified parameter of the network device in the second period is configured to the value predicted by the prediction model. In this configuration manner, application scenarios are not considered, and parameters do not need to be manually modified or configured. Therefore, this configuration manner is universal.

In a possible implementation, the method includes obtaining network running data corresponding to a first period, where the network running data includes at least one of a network transmission characteristic of a network device in the first period and a first value corresponding to a specified parameter, inputting the network running data into a prediction model, obtaining a second value, output by the prediction model based on the network running data, of the specified parameter, and configuring the specified parameter of the network device in a second period to the second value.

In a possible implementation, before inputting the network running data into a prediction model, the method further includes obtaining historical network running data corresponding to at least one historical period, where historical network running data corresponding to each of the at least one historical period includes at least one of a network transmission characteristic of the network device in the historical period and a value corresponding to the specified parameter, and the at least one historical period is a period before the first period.

In a possible implementation, inputting the network running data into a prediction model, and obtaining a second value, output by the prediction model based on the network running data, of the specified parameter includes inputting the historical network running data corresponding to the at least one historical period and the network running data into the prediction model, and obtaining a second value, output by the prediction model based on the historical network running data corresponding to the at least one historical period and the network running data, of the specified parameter, where the at least one historical period is a period before the first period.

In a possible implementation, the method further includes inputting the network running data into an initial prediction model, and training the initial prediction model to obtain the prediction model, or inputting the network running data into the prediction model, to obtain an updated prediction model.

In a possible implementation, before inputting the network running data into a prediction model, the method further includes obtaining historical network running data corresponding to a plurality of historical periods, where historical network running data corresponding to each of the plurality of historical periods includes at least one of a network transmission characteristic of the network device in the historical period and a value corresponding to the specified parameter, and the plurality of historical periods are periods before the first period, and inputting the historical network running data corresponding to the plurality of historical periods into an initial prediction model, and training the initial prediction model to obtain the prediction model.

In a possible implementation, the network transmission characteristic includes a bandwidth utilization, and before training the initial prediction model to obtain the prediction model, the method further includes constructing a configuration space including at least one association relationship, where each of the at least one association relationship is used to indicate a value corresponding to the specified parameter, establishing a first reward relationship and a second reward relationship, where the first reward relationship is used to indicate impact, on network transmission performance, of a quantity of packets buffered by the network device, and the second reward relationship is used to indicate impact of the bandwidth utilization of the network device on network transmission performance, and constructing the initial prediction model based on the configuration space, the first reward relationship, and the second reward relationship.

In a possible implementation, the network transmission characteristic includes at least one of a quantity of packets buffered by the network device in the first period, packet transmission efficiency information, and an average size of transmitted packets.

According to a second aspect, a network parameter configuration method is provided. The method includes obtaining network running data corresponding to a first period, where the network running data includes at least one of a network transmission characteristic of a network device in the first period and a first value corresponding to a specified parameter, inputting the network running data into a network traffic type recognition model, obtaining a first network traffic type, output by the network traffic type recognition model based on the network running data, of the network device in the first period, where a network traffic type is used to indicate a packet transmission status in a preset period, querying at least one preset association relationship to obtain a third value, corresponding to the first network traffic type, of the specified parameter, where each of the at least one association relationship is used to indicate that a network traffic type corresponds to a third value of the specified parameter, and the third value of the specified parameter is a preferred value of the specified parameter for network traffic indicated by the network traffic type, and configuring the specified parameter of the network device in a second period to the third value, where the second period is a period after the first period.

In the method, the first network traffic type in the first period is recognized by using the network traffic type recognition model, the third value, corresponding to the first network traffic type, of the specified parameter is determined based on the at least one association relationship, and the third value, corresponding to the first network traffic type, of the specified parameter is configured as a value of the specified parameter in the second period. In this configuration manner, application scenarios are not considered, and parameters do not need to be manually modified or configured.

In a possible implementation, before inputting the network running data into a network traffic type recognition model, the method further includes establishing the at least one association relationship, obtaining at least one historical data set, where each of the at least one historical data set includes a plurality of pieces of historical network running data, each of the plurality of pieces of historical network running data includes at least one of a network transmission characteristic of the network device in a historical period and a value corresponding to the specified parameter for a network traffic type, and the historical period is a period before the first period, and obtaining the network traffic type recognition model based on the at least one association relationship, the at least one historical data set, and an initial recognition model.

In a possible implementation, obtaining the network traffic type recognition model based on the at least one association relationship, the at least one historical data set, and an initial recognition model includes adding a network traffic type label to each piece of historical network running data in the at least one historical data set based on the at least one association relationship, where the network traffic type label is used to indicate a network traffic type, and inputting historical network running data that carries a network traffic type label into the initial recognition model, and training the initial recognition model to obtain the network traffic type recognition model.

According to a third aspect, a network parameter configuration apparatus is provided, and is configured to perform the foregoing network parameter configuration method. Optionally, the network parameter configuration apparatus includes a function module configured to perform the network parameter configuration method provided in any one of the first aspect or the optional manners of the first aspect.

According to a fourth aspect, a network parameter configuration apparatus is provided, and is configured to perform the foregoing network parameter configuration method. Optionally, the network parameter configuration apparatus includes a function module configured to perform the network parameter configuration method provided in any one of the second aspect or the optional manners of the second aspect.

According to a fifth aspect, a computer device is provided. The computer device includes a processor and a memory, the memory stores instructions, and the instructions are loaded and executed by the processor, to implement operations performed in the foregoing network parameter configuration method.

According to a sixth aspect, a storage medium is provided. The storage medium stores instructions, and the instructions are loaded and executed by a processor, to implement operations performed in the foregoing network parameter configuration method.

According to a seventh aspect, a network parameter configuration method is provided. The method is applied to a network parameter configuration system, and the network parameter configuration system includes a network device and a computing device. The method includes the following.

The network device obtains network running data corresponding to a first period, where the network running data includes at least one of a network transmission characteristic of the network device in the first period and a first value corresponding to a specified parameter.

The network device sends the network running data to the computing device.

The computing device inputs the network running data into a prediction model, and obtains a second value, output by the prediction model based on the network running data, of the specified parameter.

The computing device sends the second value to the network device.

The network device configures the specified parameter of the network device in a second period to the second value, where the second period is a period after the first period.

In a possible implementation, before the computing device inputs the network running data into the prediction model, the method further includes the following.

The network device obtains historical network running data corresponding to at least one historical period, where historical network running data corresponding to each of the at least one historical period includes at least one of a network transmission characteristic of the network device in the historical period and a value corresponding to the specified parameter, and the at least one historical period is a period before the first period.

In a possible implementation, that the computing device inputs the network running data into a prediction model, and obtains a second value, output by the prediction model based on the network running data, of the specified parameter includes the following.

The computing device inputs the historical network running data corresponding to the at least one historical period and the network running data into the prediction model, and obtains a second value, output by the prediction model based on the historical network running data corresponding to the at least one historical period and the network running data, of the specified parameter, where the at least one historical period is a period before the first period.

In a possible implementation, the method further includes the following.

The computing device inputs the network running data into an initial prediction model, and trains the initial prediction model to obtain the prediction model.

Alternatively, the computing device inputs the network running data into the prediction model, to obtain an updated prediction model.

In a possible implementation, before the computing device inputs the network running data into the prediction model, the method further includes the following.

The network device obtains historical network running data corresponding to a plurality of historical periods, where historical network running data corresponding to each of the plurality of historical periods includes at least one of a network transmission characteristic of the network device in the historical period and a value corresponding to the specified parameter, and the plurality of historical periods are periods before the first period.

The network device sends the historical network running data corresponding to the plurality of historical periods to the computing device.

The computing device inputs the historical network running data corresponding to the plurality of historical periods into an initial prediction model, and trains the initial prediction model to obtain the prediction model.

In a possible implementation, the network transmission characteristic includes a bandwidth utilization, and before the training the initial prediction model to obtain the prediction model, the method further includes the following.

The computing device constructs a configuration space including at least one association relationship, where each of the at least one association relationship is used to indicate a value corresponding to the specified parameter.

The computing device establishes a first reward relationship and a second reward relationship, where the first reward relationship is used to indicate impact, on network transmission performance, of a quantity of packets buffered by the network device, and the second reward relationship is used to indicate impact of the bandwidth utilization of the network device on network transmission performance.

The computing device constructs the initial prediction model based on the configuration space, the first reward relationship, and the second reward relationship.

In a possible implementation, the network transmission characteristic includes at least one of a quantity of packets buffered by the network device in the first period, packet transmission efficiency information, and an average size of transmitted packets.

According to an eighth aspect, a network parameter configuration method is provided. The method is applied to a network parameter configuration system, and the network parameter configuration system includes a network device and a computing device. The method includes the following.

The network device obtains network running data corresponding to a first period, where the network running data includes at least one of a network transmission characteristic of the network device in the first period and a first value corresponding to a specified parameter.

The network device sends the network running data to the computing device.

The computing device inputs the network running data into a network traffic type recognition model.

The computing device obtains a first network traffic type, output by the network traffic type recognition model based on the network running data, of the network device in the first period, where a network traffic type is used to indicate a packet transmission status in a preset period.

The computing device queries at least one preset association relationship to obtain a third value, corresponding to the first network traffic type, of the specified parameter, where each of the at least one association relationship is used to indicate that a network traffic type corresponds to a third value of the specified parameter, and the third value of the specified parameter is a preferred value of the specified parameter for network traffic indicated by the network traffic type.

The computing device sends the second value to the network device.

The network device configures the specified parameter of the network device in a second period to the third value, where the second period is a period after the first period.

In a possible implementation, before the computing device inputs the network running data into the network traffic type recognition model, the method further includes the following.

The computing device establishes the at least one association relationship.

The computing device obtains at least one historical data set, where each of the at least one historical data set includes a plurality of pieces of historical network running data, each of the plurality of pieces of historical network running data includes at least one of a network transmission characteristic of the network device in a historical period and a value corresponding to the specified parameter for a network traffic type, and the historical period is a period before the first period.

The computing device obtains the network traffic type recognition model based on the at least one association relationship, the at least one historical data set, and an initial recognition model.

In a possible implementation, that the computing device obtains the network traffic type recognition model based on the at least one association relationship, the at least one historical data set, and an initial recognition model includes the following.

The computing device adds a network traffic type label to each piece of historical network running data in the at least one historical data set based on the at least one association relationship, where the network traffic type label is used to indicate a network traffic type.

The computing device inputs historical network running data that carries a network traffic type label into the initial recognition model, and trains the initial recognition model to obtain the network traffic type recognition model.

DESCRIPTION OF EMBODIMENTS

To make the objectives, technical solutions, and advantages of this application clearer, the following further describes embodiments of this application in detail with reference to the accompanying drawings.

To facilitate understanding of an implementation process of this application, herein, some terms in this application are first explained as follows.

Figure 1:
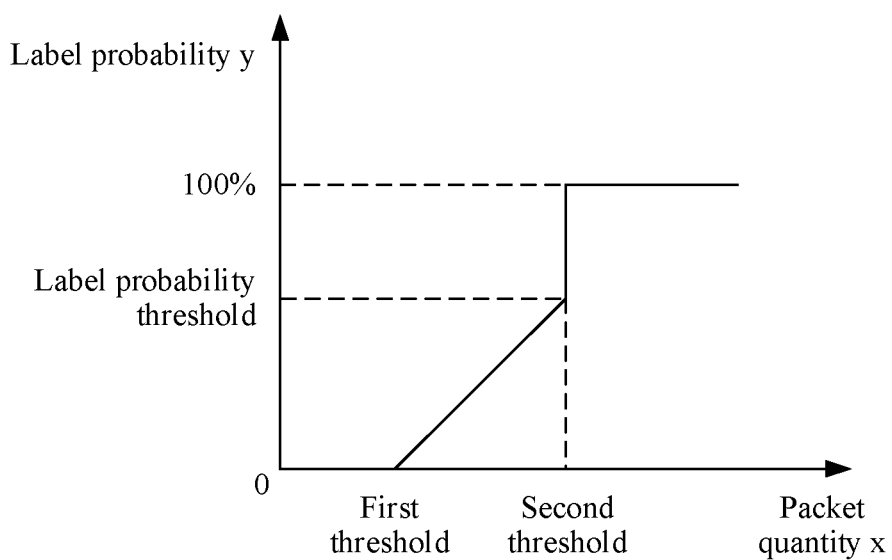
FIG. 1 is a schematic diagram of an ECN mechanism according to an embodiment of this application.

Network parameter: It is a parameter configured in this application. A network parameter in a current period is a parameter that is already configured by a network device and is used in the current period. The network parameter in a next period is a parameter to be configured by the network device, and is a parameter to be used in the next period. The network parameter may include at least one of an ECN parameter, a priority-based flow control (PFC) parameter, and a packet drop rate. The ECN parameter may include a first threshold, a second threshold, and a mark probability threshold. The first threshold is less than the second threshold. After the network device performs ECN capability negotiation with a transmit end, if the negotiation succeeds, the network device may set, based on an ECN mark probability, an ECN mark for a packet buffered by the network device. For example, a packet is marked. FIG. 1 is a schematic diagram of an ECN mechanism according to an embodiment of this application. There is a mathematical relationship shown in formula (1) between an ECN mark probability y and a quantity x of packets buffered by the network device in FIG. 1, where n is the first threshold, m is the second threshold, and a is the mark probability threshold:

$$y = \begin{cases} 0 & x \leq n \\ \dfrac{a}{m-n}(x-n) & n < x \leq m \\ 1 & x > m \end{cases} \quad (1)$$

Based on formula (1), the ECN mechanism may be as follows. When the quantity of packets buffered in the network device is less than or equal to the first threshold n, the network device does not set an ECN mark for the buffered packets. In this case, the ECN mark probability may be considered as 0. When the quantity of packets buffered in the network device is greater than the first threshold n and is less than or equal to the second threshold m, the network device may determine, based on the quantity x of buffered packets and the mark probability threshold a, the ECN mark probability y corresponding to the quantity x of buffered packets. The quantity x of buffered packets is in a linear positive correlation relationship with the determined ECN mark probability, and the determined ECN mark probability is less than or equal to the mark probability threshold. Then, the network device may set an ECN mark for the buffered packets based on the determined ECN mark probability. When the quantity of packets buffered in the network device is greater than the second threshold, the network device sets an ECN mark for all the buffered packets. In this case, the ECN mark probability may be considered as 1, that is, the packets are 100% marked.

Network traffic type: It is used to indicate a packet transmission status of a network device in a preset period. The preset period is not limited in the embodiments of this application.

Figure 2:
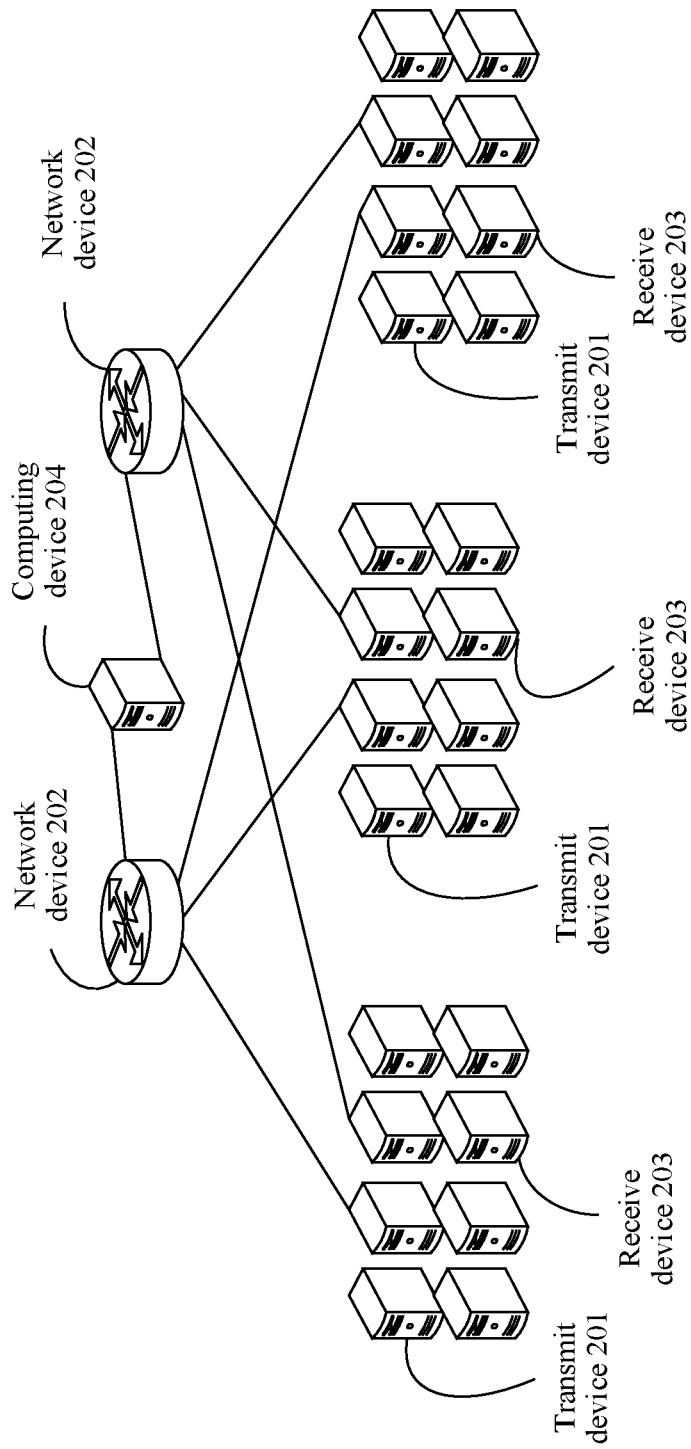
FIG. 2 is a schematic diagram of a network parameter configuration system according to an embodiment of this application.

FIG. 2 is a schematic diagram of a network parameter configuration system according to an embodiment of this application. Referring to FIG. 2, the network parameter configuration system 200 may include a transmit device 201, a network device 202, and a receive device 203. The transmit device 210 is configured to send a packet to the network device 202. The network device 202 is configured to forward, to the receive device 203, the packet sent by the transmit device. The receive device 203 is configured to receive the packet forwarded by the network device 202.

The network device 202 is further configured to obtain a network transmission characteristic and a network parameter of the network device 202 in a current period in real time, predict a value of the network parameter of the network device 202 in a next period based on the obtained network transmission characteristic and network parameter by using a prediction model, and configure the network parameter in the next period to the value predicted by the prediction model.

Figure 3:
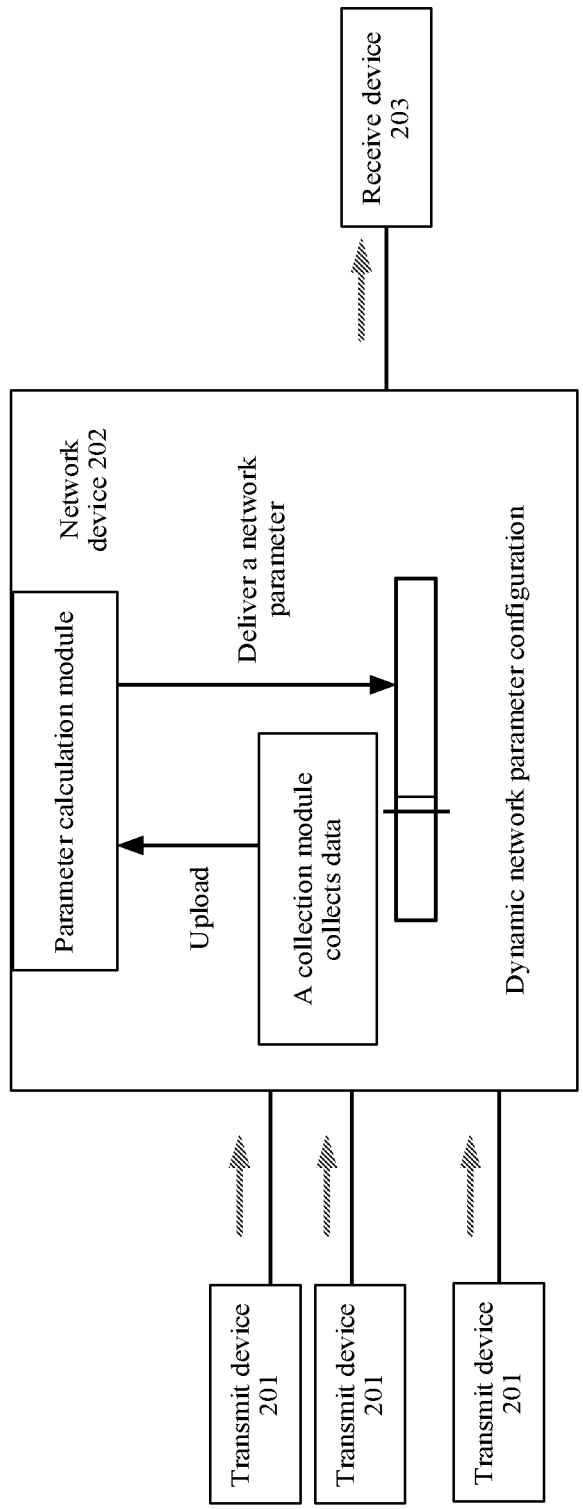
FIG. 3 is a schematic diagram of another network parameter configuration system according to an embodiment of this application.

In an implementation, a processing process of the network device in the network parameter configuration system is shown in FIG. 3. A collection module of the network device in FIG. 3 collects the network transmission characteristic and the network parameter of the network device in the current period, and uploads the collected network transmission characteristic and network parameter to a parameter calculation module. The parameter calculation module may be a field-programmable gate array (FPGA), a processor (e.g., central processing unit (CPU)), a network processor (NP), or an artificial intelligence (AI) chip. The parameter calculation module predicts, based on the network transmission characteristic and the network parameter that are uploaded by the collection module, the network parameter of the network device in the next period by using the prediction model, and delivers the predicted network parameter. The network device configures the network parameter in the next period to the network parameter delivered by the parameter calculation module.

The network device 202 may be a switch, or may be a router. The network device 202 is not limited in this embodiment of this application.

In some embodiments, the network device 202 is alternatively configured to obtain the network transmission characteristic and the network parameter of the network device 202 in the current period in real time, obtain a network traffic type in the current period based on the network transmission characteristic and the network parameter in the current period and a network traffic type recognition model, determine a value, corresponding to the network traffic type, of the network parameter based on the obtained network traffic type, and set the network parameter in the next period to the value corresponding to the network traffic type.

In some embodiments, the network parameter configuration system 200 may further include a computing device 204. The computing device 204 is configured to receive the network transmission characteristic and the network parameter in the current period that are sent by the network device 202, predict the network parameter of the network device 202 in the next period based on the received network transmission characteristic and network parameter by using the prediction model, and return the network parameter, predicted by the computing device 204, of the network device 202 in the next period to the network device 202, so that the network device 202 may directly configure the network parameter in the next period to the network parameter returned by the computing device 204.

Figure 4:
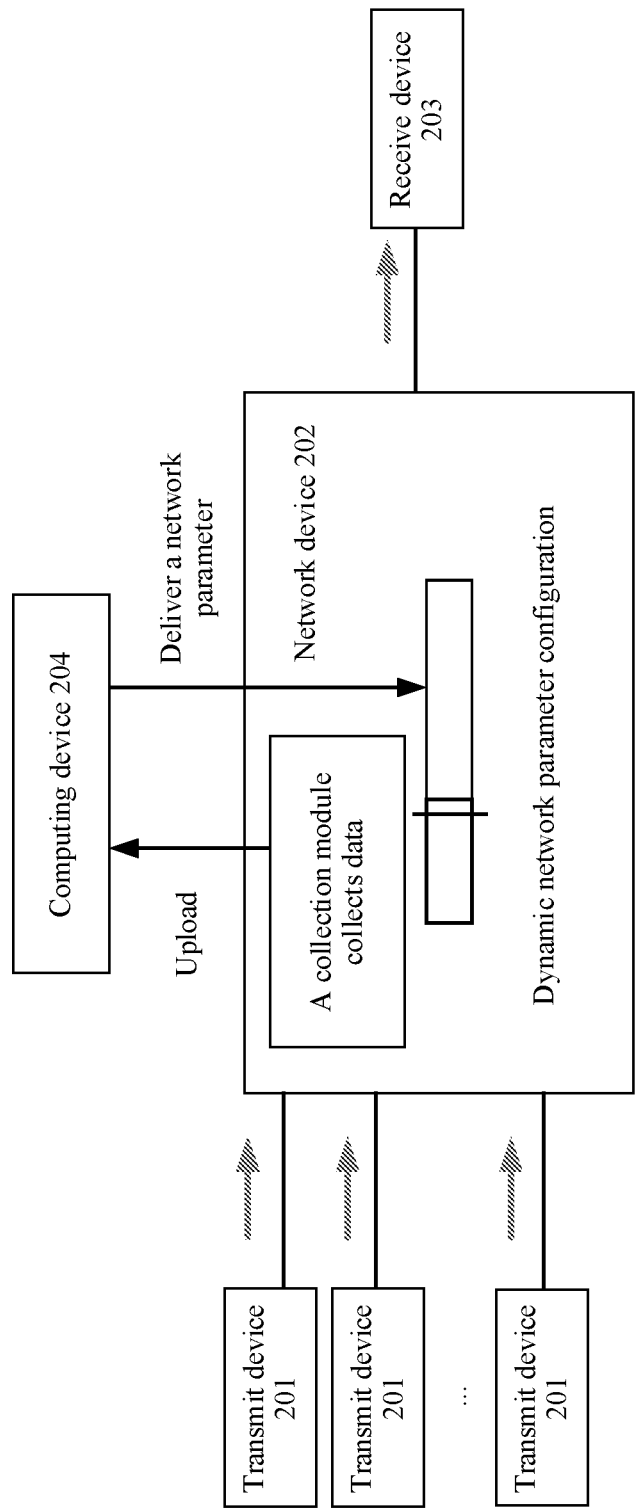
FIG. 4 is a schematic diagram of still another network parameter configuration system according to an embodiment of this application.

In some embodiments, the computing device 204 may alternatively receive the network transmission characteristic and the network parameter in the current period that are sent by the network device 202, obtain the network traffic type in the current period based on the network transmission characteristic and the network parameter in the current period and the network traffic type recognition model, determine, based on the obtained network traffic type, the network parameter corresponding to the network traffic type, and return the network parameter determined by the computing device 204 to the network device 202, so that the network device 202 may directly configure the network parameter in the next period to the network parameter returned by the computing device 204. For example, in an implementation, a processing process of the network device in the network parameter configuration system is shown in FIG. 4. The collection module of the network device in FIG. 4 collects the network transmission characteristic and the network parameter of the network device 202 in the current period, and uploads the collected network transmission characteristic and network parameter to the computing device 204. The computing device 204 predicts, based on the network transmission characteristic and the network parameter that are uploaded by the collection module, the network parameter of the network device in the next period by using the prediction model, and delivers the predicted network parameter to the network device 202. The network device 202 configures the network parameter in the next period to the network parameter delivered by the computing device 204.

Figure 5:
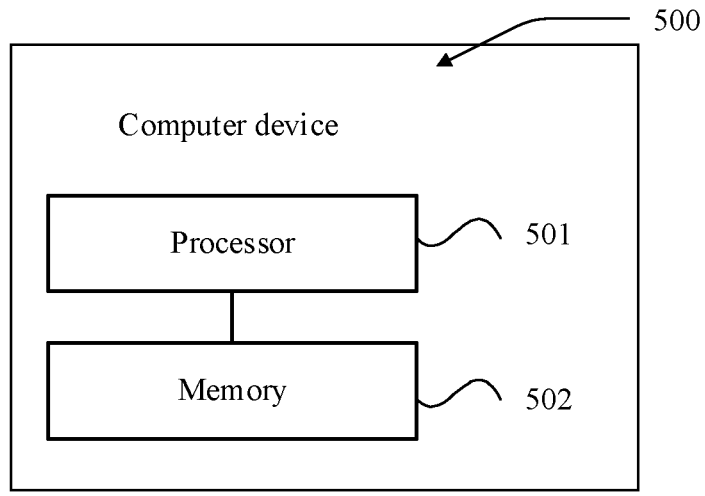
FIG. 5 is a schematic diagram of a structure of a computer device according to an embodiment of this application.

Both the network device 202 and the computing device 204 may be a computer device shown in FIG. 5. FIG. 5 is a schematic diagram of a structure of a computer device according to an embodiment of this application. The computer device 500 may vary greatly with different configuration or performance, and may include one or more CPUs 501 and one or more memories 502. The memory 502 stores at least one instruction, and the at least one instruction is loaded and executed by the processor 501 to implement methods provided in the following method embodiments. Certainly, the computer device 500 may also have a component for input and output, such as a wired or wireless network interface, a keyboard, and an input/output interface. The computer device 500 may also include another component for implementing functions of the device. Details are not described herein again.

In an example embodiment, a computer-readable storage medium is further provided, for example, a memory including instructions. The processor in the computer device may execute the instructions to complete network parameter configuration method in the following embodiments. For example, the computer-readable storage medium may be a read-only memory (ROM), a random-access memory (RAM), a compact disc (CD) ROM (CD-ROM), a magnetic tape, a floppy disk, an optical data storage device.

Figure 6:
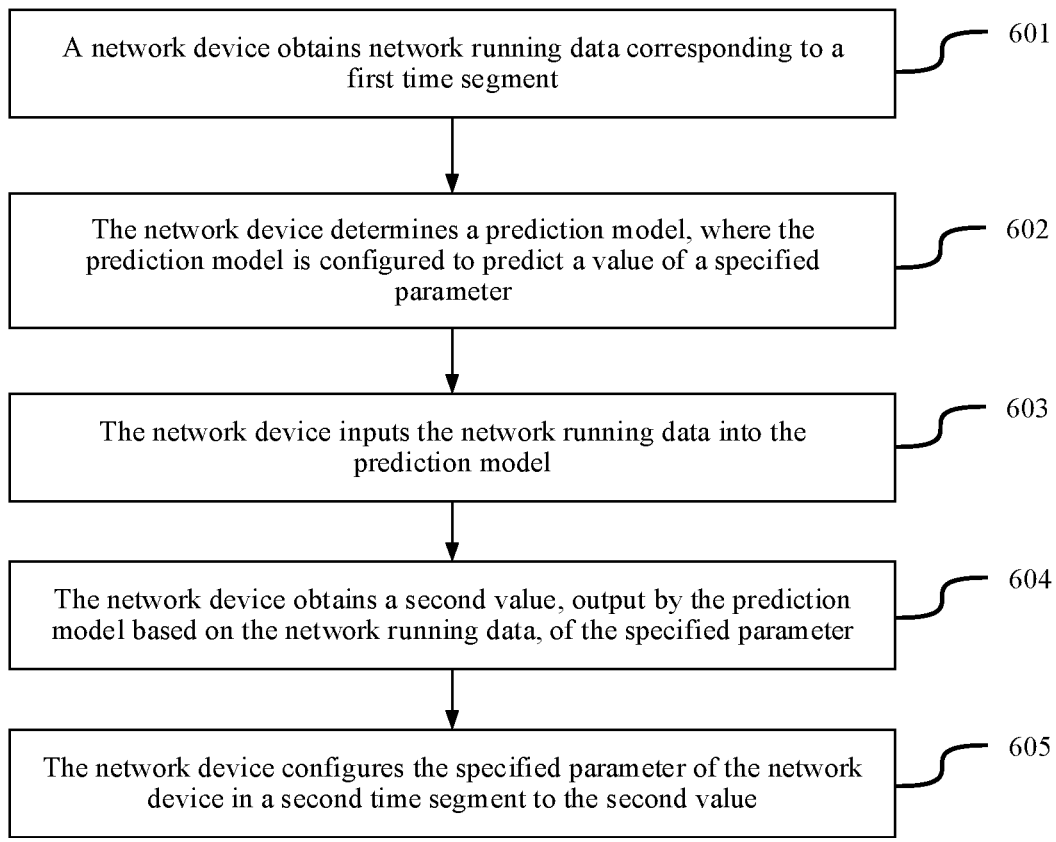
FIG. 6 is a flowchart of a network parameter configuration method according to an embodiment of this application.

In an implementation, for a process in which a network device configures a network parameter based on a prediction model, refer to a method shown in FIG. 6. The method may include the following steps 601 to 605.

601. A network device obtains network running data corresponding to a first period, where the network running data includes at least one of a network transmission characteristic of the network device in the first period and a first value corresponding to a specified parameter.

The first period is a current period. The first period may include at least two collection moments, and a duration of the first period is a duration from the first collection moment to the last collection moment in the at least two collection moments. For example, the first period includes collection moments t0 and t1, and a duration of the first period is t1-t0. In this application, the network device needs to configure a network parameter in a period after the first period. Therefore, the duration of the first period may also be considered as a configuration period, that is, the network parameter is configured once every time the duration of the first period elapses. Optionally, durations of different periods may be set based on a requirement, and durations of different periods may be different.

The specified parameter is a network parameter, and may include at least one of an ECN parameter, a PFC parameter, and a packet drop rate. The first value corresponding to the specified parameter is a value of the specified parameter of the network device in the first period. When the specified parameter is the ECN parameter, a first value of the ECN parameter includes a configured value of a first threshold, a second threshold, and a mark probability threshold in the first period. It should be noted that, this embodiment of this application is merely described by using an example in which the network parameter is the ECN parameter. A manner of configuring another network parameter is the same as a manner of configuring the ECN parameter. Herein, the manner of configuring another network parameter is not described in detail in this embodiment of this application.

The network transmission characteristic of the network device in the first period may be a characteristic of packet transmission by the network device in the first period. The network transmission characteristic includes a quantity of packets buffered by the network device in the first period, packet transmission efficiency information, and an average size of transmitted packets.

In some embodiments, the network device may select pieces of data in network running data, and then combine the pieces of data into network running data. In a possible implementation, step 601 may be implemented by using a process shown in the following steps 11 to 13.

Step 11. The network device obtains, based on buffer parameters at the first collection moment and the last collection moment in the first period, a quantity of packets buffered by the network device in the first period, where the buffer parameter at the first collection moment is used to indicate a quantity of packets buffered by the network device at the first collection moment, and the buffer parameter at the last collection moment is used to indicate a quantity of packets buffered by the network device at the last collection moment.

Optionally, step 11 may be implemented by using a process shown in the following steps 1A to 1C.

Step 1A. The network device performs outlier processing on the buffer parameter at the first collection moment and the buffer parameter at the last collection moment, to obtain a buffer parameter at the first collection moment and a buffer parameter at the last collection moment that are normal.

Optionally, a Tukey-test manner may be used to determine whether the buffer parameter at the first collection moment and the buffer parameter at the last collection moment are outliers. Alternatively, the network device presets a normal buffer parameter range. When the buffer parameter at the first collection moment or the buffer parameter at the last collection moment is a value within the normal buffer parameter range, the buffer parameter at the first collection moment or the buffer parameter at the last collection moment is not an outlier, otherwise, the buffer parameter is an outlier. In this embodiment of this application, a value range within the normal buffer parameter range is not limited.

When the buffer parameter at the first collection moment or the buffer parameter at the last collection moment is an outlier, a quantity of packets buffered by the network device in a period prior to the first period may be used as the quantity of packets buffered in the first period. Alternatively, the network device replaces an abnormal buffer parameter (outlier) with a preset buffer parameter, to obtain a normal buffer parameter. The preset buffer parameter may be a buffer parameter that meets an application scenario. The preset buffer parameter is not limited in this embodiment of this application.

It should be noted that the network device may alternatively perform outlier processing on the buffer parameters in another manner. An outlier processing manner is not limited in this embodiment of this application.

Step 1B. The network device performs exponential moving average processing on the buffer parameter at the first collection moment and the buffer parameter at the last collection moment that are normal, to obtain the quantity of packets buffered in the first period.

Optionally, an exponential moving average algorithm may be used to average the buffer parameter at the first collection moment and the buffer parameter at the last collection moment that are normal, to obtain the quantity of packets buffered in the first period. The exponential moving average algorithm may be represented by using formula (2), where Q is the quantity of packets buffered in the first period, $\alpha$ is a smoothing index, Q(i) is the buffer parameter at the first collection moment, and Q(j) is the buffer parameter at the last collection moment:

$$Q = \alpha \cdot Q(j) + (1 - \alpha) \cdot Q(i) \qquad (2)$$

Step 1C. Perform normalization processing on the quantity of packets buffered in the first period, to obtain a packet quantity normalized value, where the packet quantity normalized value is used to indicate the quantity of packets buffered in the first period.

In some embodiments, to make the quantity of packets at a same dimension with a bandwidth utilization in a subsequent calculation process, the network device may perform step 1C to perform normalization processing on the quantity of packets buffered in the first period, and replace, with the packet quantity normalized value obtained after the normalization, the quantity of packets buffered in the first period.

Step 12. The network device obtains a value of the specified parameter in the first period, packet transmission efficiency information, and an average size of transmitted packets.

The network device may determine a value of the specified parameter used in the first period as the value of the specified parameter in the first period. The packet transmission efficiency information may include a quantity of packets for which an ECN mark is set per second, an ECN mark proportion, and a bandwidth utilization.

The network device may first obtain a quantity of packets of the network device for which an ECN mark is set in the first period, and then obtain, based on the quantity of packets for which an ECN mark is set in the first period and the duration of the first period, the quantity of packets for which an ECN mark is set per second.

The network device may first obtain the quantity of packets of the network device for which an ECN mark is set in the first period and a quantity of packets forwarded in the first period, and then obtain the ECN mark proportion based on the quantity of packets for which an ECN mark is set in the first period and the quantity of packets forwarded in the first period. The ECN mark proportion is a proportion of the quantity of packets for which an ECN mark is set in the first period to the quantity of packets forwarded in the first period, for example, $\theta 1 = N\_e/N\_p$ where $\theta 1$ is the ECN mark proportion, $N\_e$ is the quantity of packets for which an ECN mark is set in the first period, and $N\_p$ is the quantity of packets forwarded in the first period.

The network device may first obtain a total quantity of bytes of packets forwarded by the network device in the first period and an inherent bandwidth of a port of the network device, then obtain, based on the total quantity of bytes and the duration of the first period, a quantity of bytes of packets forwarded in a unit time, and finally obtain the bandwidth utilization based on the quantity of bytes of packets forwarded in a unit time and the inherent bandwidth.

The network device may first obtain the total quantity of bytes of packets forwarded in the first period and the quantity of packets forwarded in the first period, and obtain the average size of transmitted packets based on the total quantity of bytes of packets forwarded in the first period and the quantity of packets forwarded in the first period. The average size of transmitted packets is a proportion of the total quantity of bytes of packets forwarded in the first period to the quantity of packets forwarded in the first period, for example, θ2=N_b/N_p, where θ2 is the average size of transmitted packets.

It should be noted that, when the specified parameter is another network parameter other than the ECN parameter, the packet transmission efficiency information further includes related data, which affects packet transmission efficiency, of the other network parameter.

It should be noted that, in some embodiments, when the network device simultaneously forwards a Transmission Control Protocol (TCP) type packet and a remote direct memory access (RDMA) over Converged Ethernet (RoCE) type packet, the network device may scale the bandwidth utilization. The network running data may further include the scaled bandwidth utilization. The scaled bandwidth utilization is represented by using $\beta, \beta=\varepsilon*\gamma$, $\varepsilon$ is the bandwidth utilization, and $\gamma$ represents a traffic percentage configured by the network device for the RoCE type packet.

Step 13. The network device combines the obtained quantity of packets buffered in the first period, the obtained value of the specified parameter in the first period, the obtained efficiency information of packet transmission, and the obtained average size of transmitted packets into the network running data corresponding to the first period.

The network running data may be in a form of a matrix, and data in the matrix is the data obtained by the network device in steps 11 and 12. A manner of combining the data in the matrix is not optionally limited in this embodiment of this application, and an optional process of the combination into the network running data is not limited.

602. The network device determines a prediction model, where the prediction model is configured to predict a value of the specified parameter.

The prediction model may be a deep reinforcement learning model. The network device may first construct an initial prediction model, and then train the initial prediction model to obtain the prediction model. In a possible implementation, step 602 may be implemented by using a process shown in the following steps 21 to 25.

Step 21. The network device constructs a configuration space including at least one association relationship, where each of the at least one association relationship is used to indicate a value corresponding to the specified parameter.

Values that correspond to the specified parameter and are indicated in the at least one association relationship are preset values corresponding to the specified parameter. Each association relationship may include a sequence number of the association relationship and a value, corresponding to the association relationship, of the specified parameter. A configuration space shown in Table 1 is used as an example. In Table 1, an association relationship 1 includes a sequence number 1 and corresponding values 7, 50, and 0.1, corresponding to the sequence number 1, of the specified parameter. In this case, the specified parameter is an ECN parameter, 7 is a first threshold, 50 is a second threshold, and 0.1 is a mark probability threshold.

TABLE 1

| | ECN parameter | | |
|---|---|---|---|
| No. | First threshold (KB) | Second threshold (KB) | Mark probability threshold |
| 0 | 7 | 50 | 0.01 |
| 1 | 7 | 50 | 0.1 |
| 2 | 7 | 750 | 0.01 |

TABLE 1-continued

| | ECN parameter | | |
|---|---|---|---|
| No. | First threshold (KB) | Second threshold (KB) | Mark probability threshold |
| 3 | 7 | 750 | 0.1 |
| 4 | 7 | 8000 | 0.01 |
| 5 | 7 | 8000 | 0.1 |
| 6 | 500 | 750 | 0.01 |
| 7 | 500 | 750 | 0.1 |
| 8 | 500 | 8000 | 0.01 |
| 9 | 500 | 8000 | 0.1 |
| 10 | 2000 | 8000 | 0.01 |
| 11 | 2000 | 8000 | 0.1 |

Step 22. The network device establishes a first reward relationship and a second reward relationship, where the first reward relationship is used to indicate impact, on network transmission performance, of a quantity of packets buffered by the network device, and the second reward relationship is used to indicate impact of a bandwidth utilization of the network device on network transmission performance.

Figure 7:
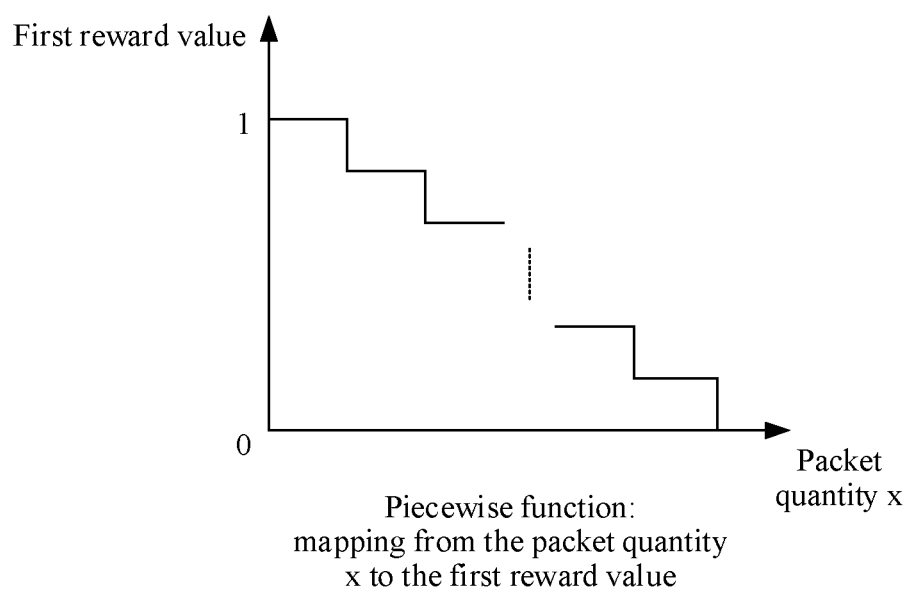
FIG. 7 is a schematic diagram of a piecewise function of a negative correlation according to an embodiment of this application.

When the network device cannot forward a received packet in time, the network device first buffers the packet that is not forwarded, and subsequently forwards the buffered packet. If the network device buffers a large quantity of packets, it indicates that network congestion may occur on the network device in this case, that is, network transmission performance of the network device may be low in this case. Therefore, the first reward relationship may be a negative correlation relationship between a first reward value and a quantity of packets buffered by the network device. The negative correlation relationship may be as follows. As the quantity of packets buffered by the network device increases, the first reward value decreases in a stepwise manner. For example, FIG. 7 is a schematic diagram of a piecewise function of a negative correlation according to an embodiment of this application. In FIG. 7, the first reward value has a maximum value of 1 and a minimum value of 0, and as the quantity of packets buffered by the network device increases, the first reward value decreases in a stepwise manner within a range [0, 1]. Certainly, the negative correlation relationship may alternatively be as follows. As the quantity of packets buffered by the network device linearly increases, the first reward value linearly decreases. That is, when the quantity of packets buffered by the network device is larger, the first reward value is lower, and the network transmission performance of the network device is lower. Otherwise, the first reward value is higher, and the network transmission performance of the network device is higher. In this embodiment of this application, an optional case of the negative correlation relationship between the first reward value and the quantity of packets buffered by the network device is not limited.

When the bandwidth utilization of the network device is higher, it indicates that the transmission performance of the network device is higher. Otherwise, the transmission performance of the network device is lower. In this case, the second reward relationship may be a positive correlation relationship between a second reward value and the bandwidth utilization. The positive correlation relationship may be as follows. As the bandwidth utilization increases, the second reward value increases in a stepwise manner. The positive correlation relationship may alternatively be as follows. As the bandwidth utilization linearly increases, the second reward value linearly increases. That is, when the bandwidth utilization is higher, the second reward value is higher, and the transmission performance of the network device is higher. Otherwise, the second reward value is lower, and the transmission performance of the network device is lower. In this embodiment of this application, an optional case of the positive correlation relationship between the second reward value and the bandwidth utilization is not limited.

In some embodiments, the network device may further establish a third reward relationship. The third reward relationship is used to indicate impact of a service performance index of the network device on network transmission performance. The service performance index may be a transmission latency or the like. The service performance index is not optionally limited in this embodiment of this application.

When a current service performance index is closer to a preset index, a difference between the service performance index and the preset index is smaller, and indicates that current network transmission performance of the network device is better. The service performance index may be input/output operations per second (IOPS), and the preset index is an index value that is set in advance. The third reward relationship may be a negative correlation relationship between the difference between the service performance index and the preset index and a third reward value. That is, when the difference between the service performance index and the preset index is smaller, the third reward value is larger. Otherwise, the third reward value is smaller. The negative correlation relationship is similar to the negative correlation relationship indicated by the first reward relationship. Herein, the negative correlation relationship is not optionally limited in this embodiment of this application.

Step 23. The network device constructs an initial prediction model based on the configuration space, the first reward relationship, and the second reward relationship.

The network device may first obtain a target reward relationship based on the first reward relationship and the second reward relationship. The target reward relationship may be used to indicate impact of a quantity of packets buffered by the network device and a bandwidth utilization on network transmission performance. Then the network device may construct an initial prediction model based on the target reward relationship and the configuration space.

The target reward relationship may be determined by using relationships between the target reward value and the first reward value and between the target reward value and the second reward value. When the first reward value or/and the second reward value is/are larger, the target reward value is larger, and the network transmission performance is higher.

The target reward relationship may be represented by using the following formula (3), where Reward is the target reward value, $R_{thput}$ is the first reward value, $R_{qdepth}$ is the second reward value, and w1 and w2 are weight parameters, where for w1 and w2, values of w1 and w2 may be set based on a preference of a service between a throughput and a latency, and values of w1 and w2 are not limited in this embodiment of this application:

$$\text{Reward} = w1 * R_{thput} + w2 * R_{qdepth} \quad (3)$$

The reward relationship may alternatively be represented by using the following formula (4), where w3 is a weight parameter, and $R_{kqi}$ is the third reward value:

$$\text{Reward} = w1 * R_{thput} + w2 * R_{qdepth} + w3 * R_{kqi} \quad (4)$$

A process of constructing, by the network device, an initial prediction model based on the target reward relationship and the configuration space may be constructing, based on the target reward relationship and the configuration space, an initial prediction model including an action network and an execution module, where the action network is configured to allocate a value of the specified parameter in the configuration space to each piece of input network running data, and the execution module is configured to simulate a packet transmission environment, affect the simulated packet transmission environment based on the value, allocated by the action network, of the specified parameter, calculate a target reward value based on impact of the value of the specified parameter on the packet transmission environment, and output network running data in the affected packet transmission environment to the action network. The action network may be a neural network. The action network is not optionally limited in this embodiment of this application.

Step 24. The network device obtains historical network running data corresponding to a plurality of historical periods, where historical network running data corresponding to each of the plurality of historical periods includes a network transmission characteristic of the network device in the historical period and a value corresponding to the specified parameter, and the plurality of historical periods are periods before the first period.

The plurality of historical periods may be periods in which the network device does not use the network parameter configuration method provided in this embodiment of this application. The historical network running data corresponding to the plurality of historical periods may be considered as training samples for model training. A process in which the network device obtains the historical network running data corresponding to each historical period is similar to the process in which the network device obtains the network running data corresponding to the first period.

Step 25. The network device trains the initial prediction model to obtain the prediction model.

The network device may train the initial prediction model by using an offline training process or an online training process. The offline training process may be as follows. The network device inputs the historical network running data corresponding to the plurality of historical periods into the initial prediction model, and trains the initial prediction model to obtain the prediction model.

The online training process may be as follows. The network device inputs the network running data corresponding to the first period into the initial prediction model, and trains the initial prediction model to obtain the prediction model. Alternatively, the network device inputs the network running data corresponding to the first period into the prediction model to obtain an updated prediction model, where the updated prediction model is configured to predict, based on network running data corresponding to a second period, a fourth value of the specified parameter of the network device in a third period, so that the network device configures the specified parameter in the third period to the fourth value. The second period is a period after the first period, and the third period is a period after the second period.

For ease of description, the historical network running data corresponding to the plurality of historical periods and the network running data corresponding to the first period are collectively referred to as target network running data, and a process of inputting the target network running data into the initial prediction model, and training the initial prediction model to obtain the prediction model may be initializing a model parameter in the action network, and inputting the target network running data into the action network, to start a preset quantity of times of training. Each time training is performed, the action network allocates a value of the specified parameter for each piece of input target network running data, and inputs an allocated maximum value of the specified parameter into the execution module. The execution module affects the simulated packet transmission environment by using the received value of the specified parameter, and outputs new network running data and a target reward value in the affected packet transmission environment. The action network updates the model parameter of the action network based on the target reward value returned by the execution module. After the model parameter is updated, the new network running data is used as an input to the action network, to start a next time of training. When the preset quantity of times of training is reached or the target reward value output by the execution module reaches an expected value, the training ends. After the foregoing training process, the model parameter of the action network in the initial prediction model is updated, and the initial prediction model is updated to the prediction model.

It should be noted that, when the prediction model is obtained based on the offline training process, step 602 needs to be performed only once before or after step 601, rather than performed a plurality of times. When the prediction model is obtained based on the online training process, the process of obtaining the initial recognition model shown in steps 21 to 23 needs to be performed only once before or after step 601, rather than performed a plurality of times, while steps 24 and 25 need to be performed each time model prediction is performed.

It should be noted that, when the network parameter configuration system includes the computing device, the process shown in step 602 may alternatively be performed by the computing device. The process of obtaining the historical network running data in step 24 may be as follows. The computing device receives the historical network running data sent by the network device, to obtain the historical network running data.

603. The network device inputs the network running data into the prediction model.

The network device uses the network running data in the first period as input data to the prediction model, and inputs the network running data in the first period into the prediction model. The prediction model predicts, based on the input network running data, a second value of the specified parameter of the network device in a second period, and outputs the predicted second value of the specified parameter in the second period.

It should be noted that when the prediction model is a model obtained through offline training, the network device may directly perform step 603. When the prediction model is a model obtained through online training, the network device may input the network running data into the prediction model to obtain an updated prediction model, that is, consider the network running data as a training sample, and train the prediction model to obtain an updated prediction model. Then, the network device does not perform step 603, but considers the network running data as input data to the updated prediction model, and inputs the network running data into the updated prediction model. The updated prediction model predicts, based on the input network running data, a value of the specified parameter of the network device in a second period, and outputs the predicted second value of the specified parameter in the second period. When the prediction model is a model obtained by online training, after step 603 is performed, the network device may further consider the network running data as a training sample, and input the network running data into the prediction model to obtain an updated prediction model, so that in the second period, the network device may input network running data corresponding to the second period into the updated prediction model, so that the updated prediction model outputs, based on the network running data corresponding to the second period, a predicted fourth value of the specified parameter of the network device in a third period.

604. The network device obtains the second value, output by the prediction model based on the network running data, of the specified parameter.

When the prediction model outputs the second value of the specified parameter based on the network running data, the network device may directly obtain the second value.

A process of outputting, by the prediction model, the second value of the specified parameter based on the network running data may be inputting at least one piece of network running data into the action network in the prediction model, so that the action network allocates a value of the specified parameter in the configuration space for each piece of input network running data based on a current model parameter, and outputs an allocated maximum value of the specified parameter from the prediction model as the second value of the specified parameter.

It should be noted that the process shown in steps 603 and 604 is a process in which the network device obtains, based on the network running data corresponding to the first period and the prediction model, the second value of the specified parameter of the network device in the second period. When the network parameter configuration system includes the computing device, the process may alternatively be performed by the computing device. When steps 603 and 604 are performed by the computing device, after completing step 604, the computing device may send the second value, obtained by the computing device, of the specified parameter to the network device. After receiving the second value sent by the computing device, the network device may configure the specified parameter in the second period by performing the following step 605.

It should be noted that, in some embodiments, the network device may alternatively obtain historical network running data corresponding to at least one historical period, where historical network running data corresponding to each of the at least one historical period includes a network transmission characteristic of the network device in the historical period and a value corresponding to the specified parameter, and the at least one historical period is a period before the first period.

To further indicate the historical period in this case, for example, a time from a moment at which the network device starts to configure the specified parameter by using the method provided in this embodiment of this application to the last collection moment in the first period includes periods 1 to 5, where the period 5 is the first period, and each historical period may be any one of the periods 1 to 4. A process in which the network device obtains the historical network running data corresponding to the historical period is similar to the process in which the network device obtains the network running data corresponding to the first period.

Herein, the process in which the network device obtains the historical network running data corresponding to the historical period is not described in detail in this embodiment of this application.

After the network device obtains the historical network running data corresponding to the at least one historical period, the network device may input the historical network running data corresponding to the at least one historical period and the network running data into the prediction model, and obtain a second value, output by the prediction model based on the historical network running data corresponding to the at least one historical period and the network running data, of the specified parameter. The at least one historical period is a period before the first period.

The historical network running data corresponding to the at least one historical period and the network running data corresponding to the first period may form a large amount of historical data, and the large amount of historical data can better reflect a packet transmission status in the second period. Therefore, when the prediction model predicts, based on the large amount of historical data, the value of the specified parameter of the network device in the second period, prediction accuracy of the model can be improved.

Figure 8:
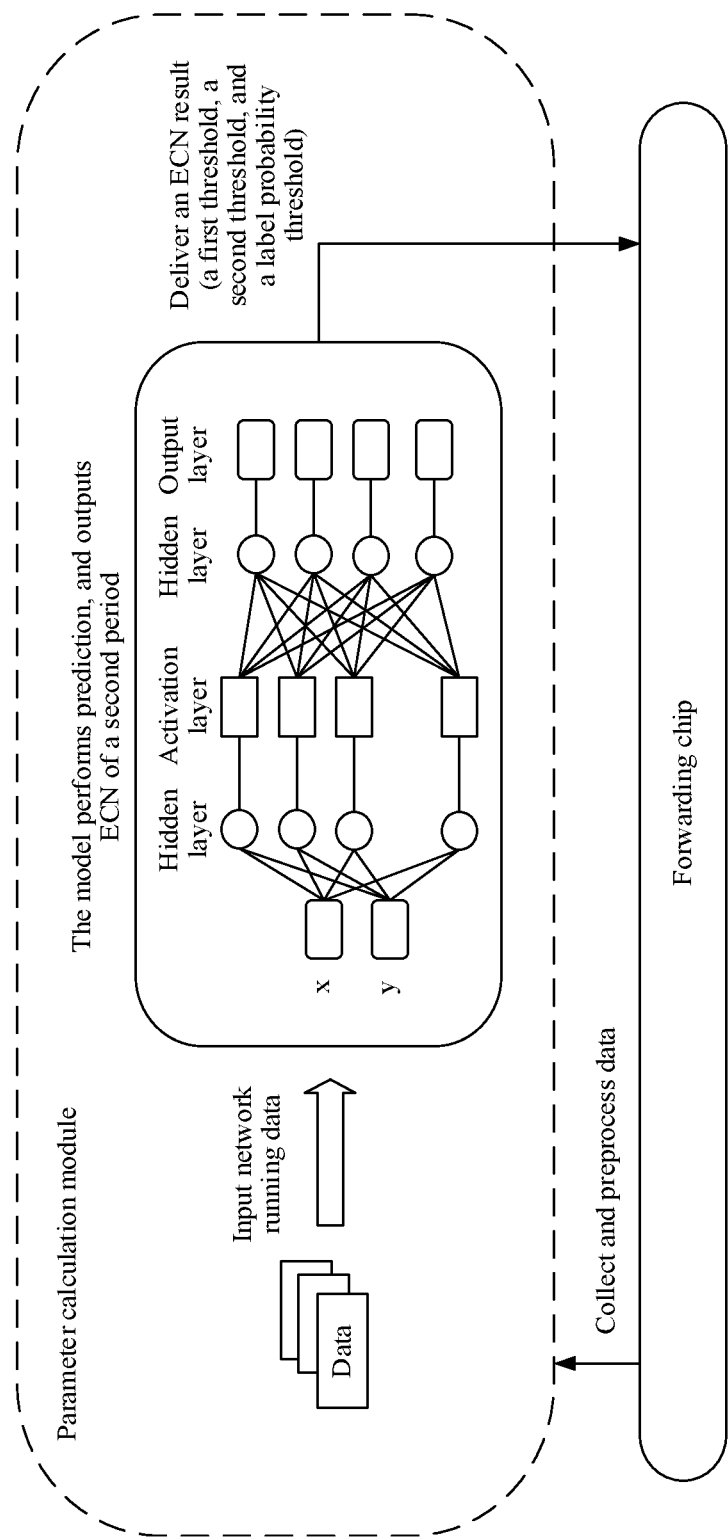
FIG. 8 is a schematic diagram of a network parameter configuration process according to an embodiment of this application.

The process shown in steps 603 and 604 may be performed by a parameter calculation module in the network device. For example, FIG. 8 is a schematic diagram of a network parameter configuration process according to an embodiment of this application. In FIG. 8, the network device obtains the network running data in the first period and historical network running data in a historical period through data collection and preprocessing. The preprocessing refers to a process of obtaining network running data based on collected data. The network device may input the network running data and the historical network running data to the parameter calculation module by using a forwarding chip. The parameter calculation module inputs the network running data as input data x and the historical network running data as input data y, and inputs the input data x and y into the action network in the prediction model. An input layer, a hidden layer, and an activation (using rectified linear unit (ReLU) activation function) layer in the action network predict, based on the input network running data and historical network running data, a value of the ECN parameter in the second period, and an output layer in the prediction model outputs the value of the ECN parameter in the second period. The parameter calculation module delivers the value of the ECN parameter in the second period to the forwarding chip. The forwarding chip forwards the value of the ECN parameter in the second period to a configuration module, so that the configuration module configures the ECN parameter in the second period to the value, forwarded by the forwarding chip, of the ECN parameter.

605. The network device configures the specified parameter of the network device in the second period to the second value.

After obtaining the second value output by the prediction model, the network device may directly configure the specified parameter of the network device in the second period to the second value. In this embodiment of this application, a manner and a process of configuring the specified parameter by the network device are not optionally limited, provided that it is ensured that the network device can perform packet transmission based on the second value of the specified parameter in the second period.

In the method provided in this embodiment of this application, the network running data corresponding to the first period is input into the prediction model, so that the prediction model predicts, based on the input network running data, the value of the specified parameter of the network device in the second period, and the specified parameter of the network device in the second period is configured to the value predicted by the prediction model. In this configuration manner, application scenarios are not considered, and parameters do not need to be manually modified or configured. Therefore, this configuration manner is universal. In addition, when the prediction model predicts the value of the specified parameter of the network device in the second period based on a large amount of historical data, prediction accuracy of the model can be improved.

Figure 9:
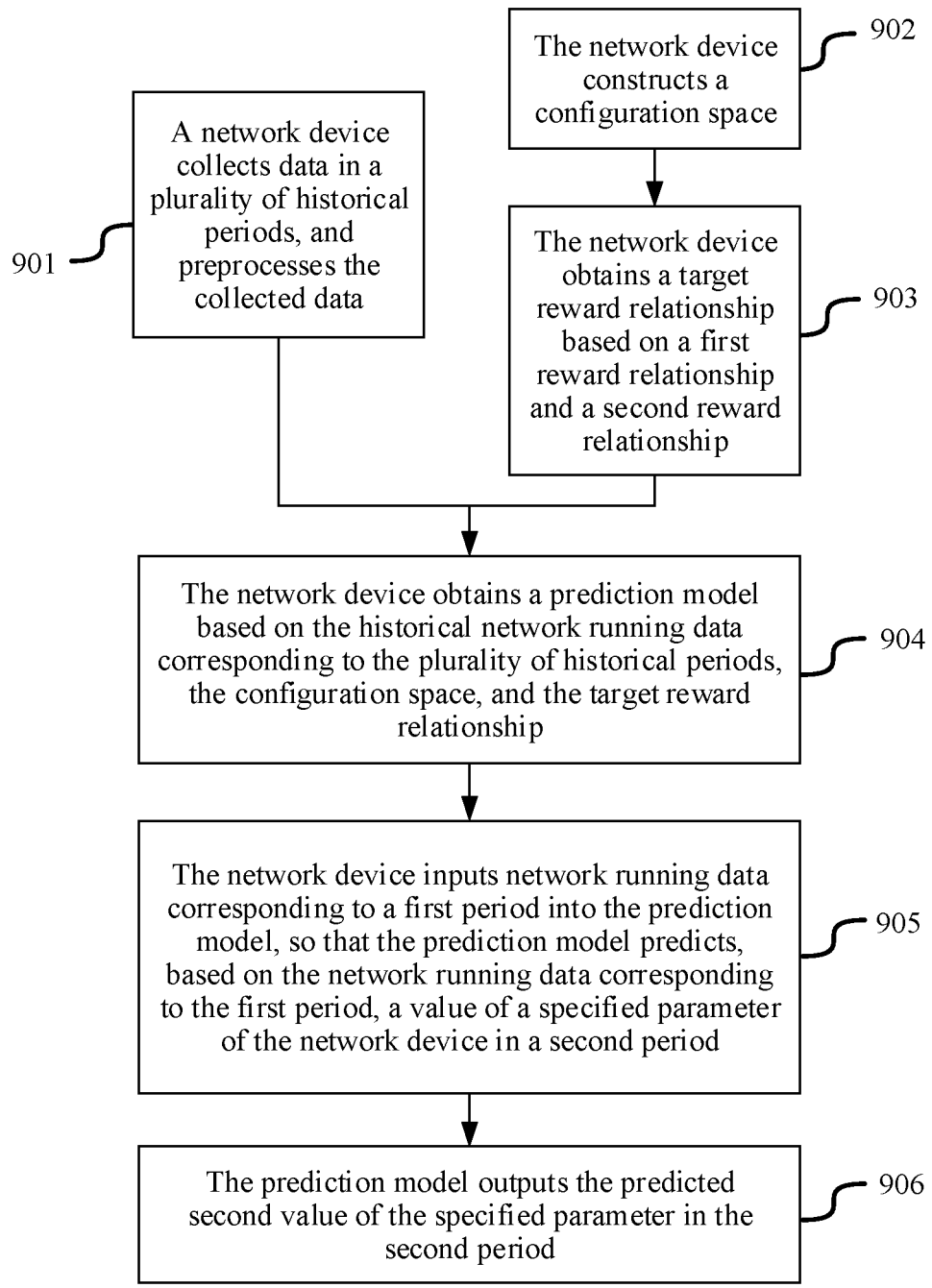
FIG. 9 is a flowchart of a network parameter prediction method according to an embodiment of this application.

To further describe a process in which the network device predicts a to-be-configured network parameter based on the prediction model obtained through offline training, refer to FIG. 9, which is a flowchart of a network parameter prediction method according to an embodiment of this application. Optionally, a procedure of the method includes a process shown in steps 901 to 906.

901. A network device collects data in a plurality of historical periods, and preprocesses the collected data to obtain historical network running data corresponding to the plurality of historical periods.

A process in which the network device collects, in any one of the plurality of historical periods, buffer parameters at the first collection moment and the last collection moment, a quantity of packets for which an ECN mark is set, a quantity of forwarded packets, a total quantity of bytes of forwarded packets, an inherent bandwidth of a port of the network device, and the like, and preprocesses the collected data to obtain historical network running data corresponding to the any historical period is the same as the process of obtaining the historical network running data in step 12 and step 13. Herein, a process of preprocessing the collected data is not described in detail in this embodiment of this application.

After the network device performs the data processing process of the any historical period for the plurality of historical periods, the network device may obtain the historical network running data corresponding to the plurality of historical periods.

902. The network device constructs a configuration space.

A process shown in step 902 is the same as the process shown in step 21. Herein, step 902 is not described in detail in this embodiment of this application.

903. The network device obtains a target reward relationship based on a first reward relationship and a second reward relationship.

A process shown in step 903 is correspondingly described in step 23. Herein, step 903 is not described in detail in this embodiment of this application.

904. The network device obtains a prediction model based on the historical network running data corresponding to the plurality of historical periods, the configuration space, and the target reward relationship.

The network device may first construct an initial prediction model based on the configuration space and the target reward relationship. For an optional process, refer to step 23. Then, the network device may train the initial prediction model based on the plurality of historical periods, to obtain the prediction model. For an optional process, refer to step 25.

905. The network device inputs network running data corresponding to a first period into the prediction model, so that the prediction model predicts, based on the network running data corresponding to the first period, a value of a specified parameter of the network device in a second period.

906. The prediction model outputs the predicted second value of the specified parameter in the second period.

Figure 10:
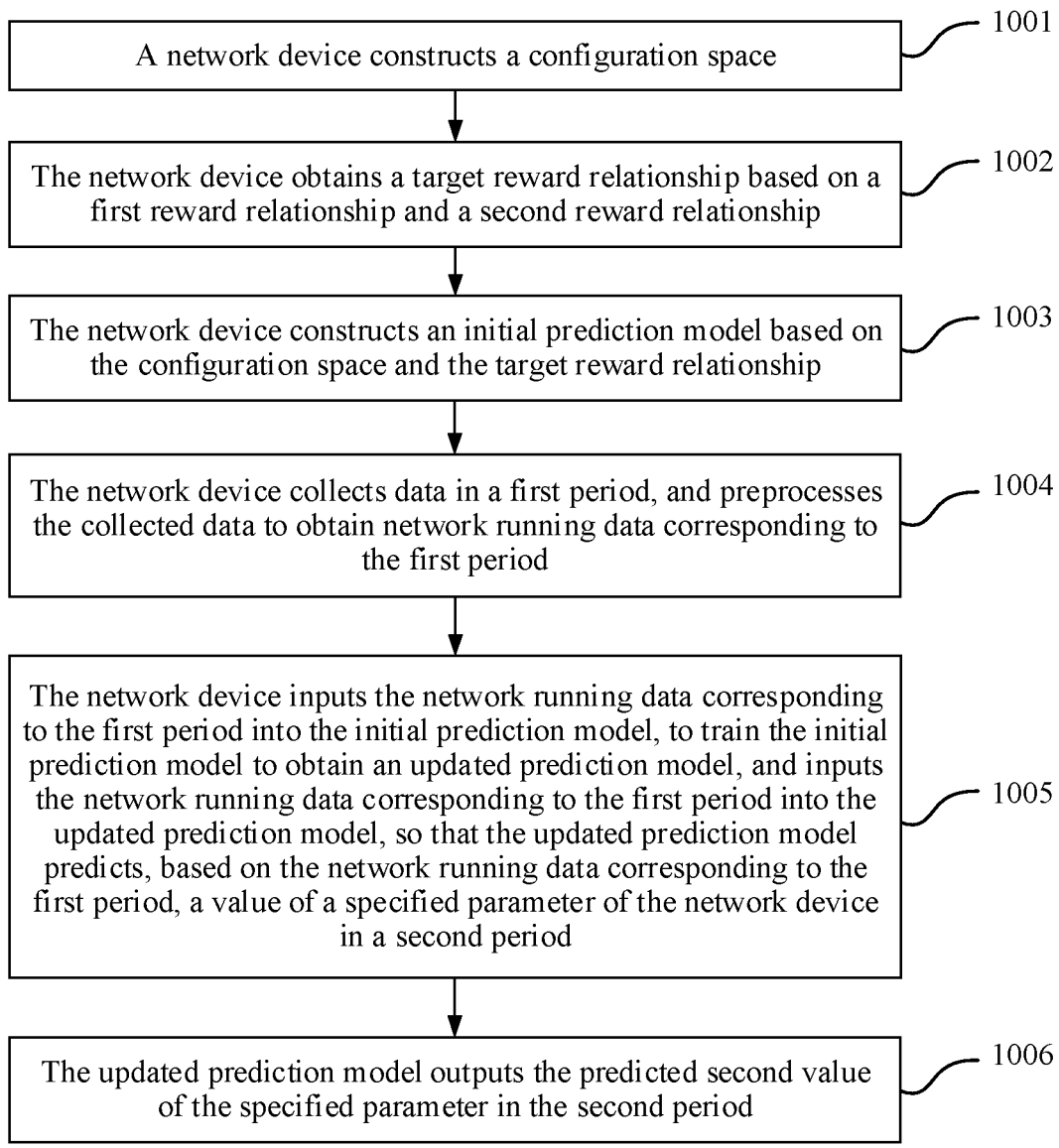
FIG. 10 is a flowchart of another network parameter prediction method according to an embodiment of this application.

To further describe a process in which the network device predicts a to-be-configured network parameter based on the prediction model obtained through online training, refer to FIG. 10, which is a flowchart of a network parameter prediction method according to another embodiment of this application. Optionally, a procedure of the method includes a process shown in steps 1001 to 1006.

1001. A network device constructs a configuration space.

A process shown in step 1001 is the same as the process shown in step 21. Herein, step 1001 is not described in detail in this embodiment of this application.

1002. The network device obtains a target reward relationship based on a first reward relationship and a second reward relationship.

A process shown in step 1002 is correspondingly described in step 23. Herein, step 1002 is not described in detail in this embodiment of this application.

1003. The network device constructs an initial prediction model based on the configuration space and the target reward relationship.

A process shown in step 1003 is correspondingly described in step 23. Herein, step 1003 is not described in detail in this embodiment of this application.

1004. The network device collects data in a first period, and preprocesses the collected data to obtain network running data corresponding to the first period.

A process of obtaining the network running data corresponding to the first period in step 1004 is the same as the process of obtaining the historical network running data in the historical period in step 601. Herein, step 1004 is not described in detail in this embodiment of this application.

1005. The network device inputs the network running data corresponding to the first period into the initial prediction model, trains the initial prediction model to obtain an updated prediction model, and inputs the network running data corresponding to the first period into the updated prediction model, so that the updated prediction model predicts, based on the network running data corresponding to the first period, a value of a specified parameter of the network device in a second period.

1006. The updated prediction model outputs the predicted second value of the specified parameter in the second period.

The network device may perform step 1004 in the second period, to obtain network running data corresponding to the second period, train the updated prediction model based on the network running data corresponding to the second period, to obtain a new prediction model, and input the network running data corresponding to the second period into the new prediction model, so that the new prediction model may output a fourth value of the specified parameter in a third period. By analogy, the network device performs the process of steps 1004 to 1006 in each subsequent period.

Figure 11:
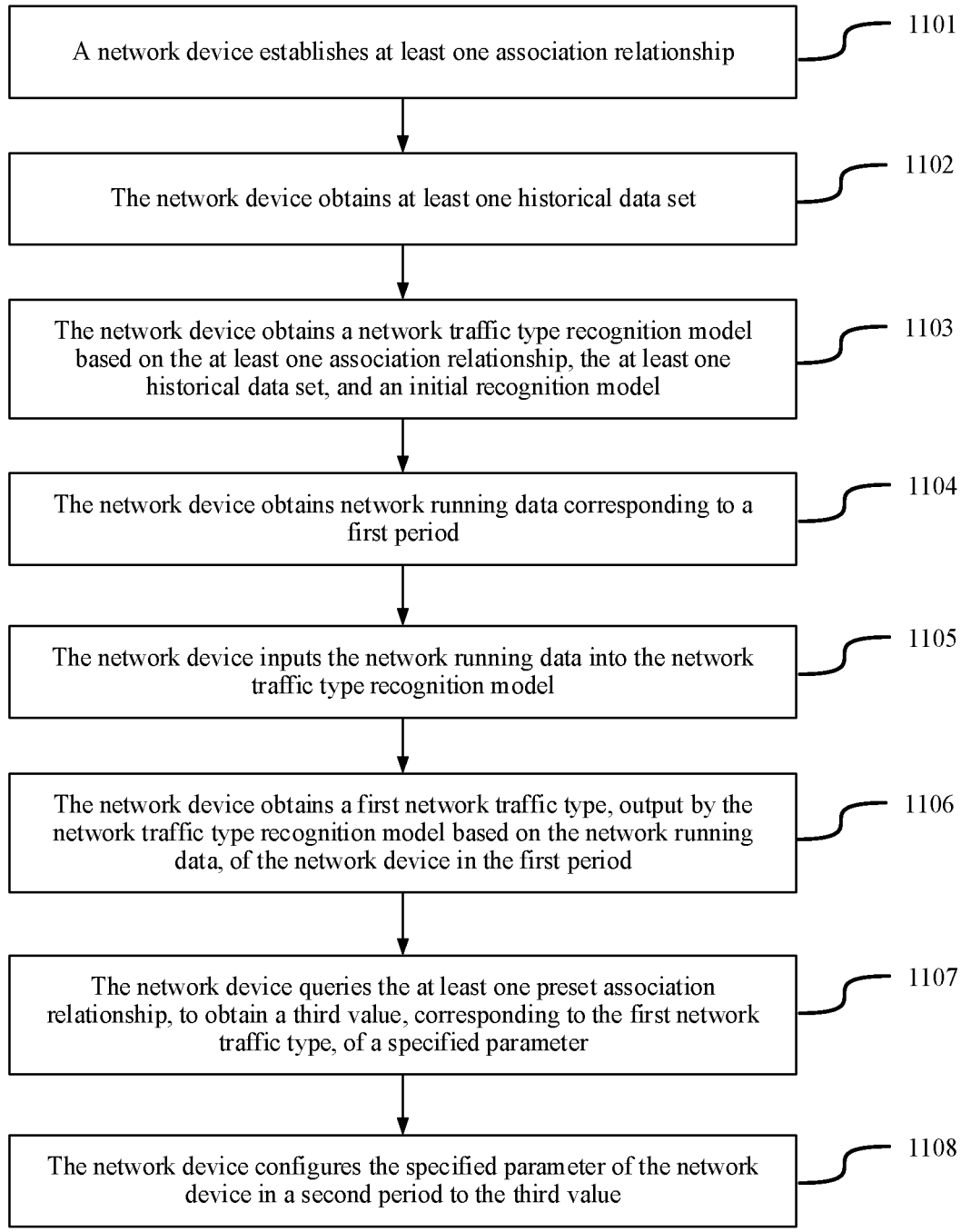
FIG. 11 is a flowchart of a network parameter configuration method according to an embodiment of this application.

In some embodiments, the network device may further recognize a current network traffic type based on current network running data, and configure a network parameter based on the recognized network traffic type. FIG. 11 is a flowchart of a network parameter configuration method according to an embodiment of this application. A procedure of the method includes steps 1101 to 1108.

1101. A network device establishes at least one association relationship, where each of the at least one association relationship is used to indicate that a network traffic type corresponds to a third value of a specified parameter, and the third value of the specified parameter is a preferred value of the specified parameter for network traffic indicated by the network traffic type.

For any service scenario, based on a service requirement, the any service scenario may correspond to at least one network traffic type. A network traffic type is used to indicate a packet transmission status in a preset period. For example, when three transmit devices send packets to the network device in a preset period, and the network device forwards the packets sent by the three transmit devices to two receive devices, a packet transmission status of the network device in the preset period is a network traffic type. For another example, when one transmit device sends a packet to the network device in a preset period, and the network device forwards the packet sent by the one transmit device to three receive devices, a packet transmission status of the network device in the preset period is a network traffic type. For another example, when the network device may transmit packets on a plurality of services in different periods, if a packet on one service is transmitted in a preset period, a packet transmission status in this case is a network traffic type. If a packet on another service is transmitted within the preset period, a packet transmission status in this case is another network traffic type.

The network device may determine, based on past parameter configuration experience, a preferred value of the specified parameter for network traffic indicated by each network traffic type, and associatively store each network traffic type and the preferred value, corresponding to the network traffic type, of the specified parameter. Therefore, each network traffic type has an association relationship with a preferred value of the specified parameter.

It should be noted that, when the network parameter configuration system includes the computing device, the process shown in step 1101 may alternatively be performed by the computing device.

1102. The network device obtains at least one historical data set, where each of the at least one historical data set includes a plurality of pieces of historical network running data, each of the plurality of pieces of historical network running data includes at least one of a network transmission characteristic of the network device in a historical period and a value corresponding to the specified parameter for a network traffic type, and the historical period is a period before the first period.

Because each association relationship corresponds to a network traffic type, the at least one association relationship corresponds to at least one network traffic type. For any one of the at least one network traffic type, the network device obtains a plurality of pieces of historical network running data for the any network traffic type, and combines the obtained historical network running data into a historical data set corresponding to the any network traffic type. When the network device performs the foregoing process of obtaining a historical data set for the at least one network traffic type, the network device may finally obtain at least one historical data set.

A process in which the network device obtains a plurality of pieces of historical network running data for any network traffic type is the same as the process shown in step 24. A difference from step 24 lies in that the network device needs to obtain historical network running data for the any network traffic type, while no network traffic type is limited in step 24.

It should be noted that, when the network parameter configuration system includes the computing device, after completing step 1102, the network device may send the at least one obtained historical data set to the computing device, and the computing device performs a process shown in the following steps 1103 to 1107.

1103. The network device obtains a network traffic type recognition model based on the at least one association relationship, the at least one historical data set, and an initial recognition model.

The network device may first determine a network traffic type in an association relationship corresponding to each historical data set. For any historical data set, a plurality of pieces of historical network running data in the any historical data set can comprehensively reflect a packet transmission status indicated by a corresponding network traffic type. Then, the network device may train the initial recognition model by using each piece of historical network running data in each historical data set as a sample, to obtain the network traffic type recognition model for recognizing a network traffic type. In a possible implementation, step 1103 may be implemented by using a process shown in the following steps 31 and 32.

Step 31. The network device adds a network traffic type label to each piece of historical network running data in the at least one historical data set based on the at least one association relationship, where the network traffic type label is used to indicate a network traffic type.

Because historical network running data in each historical data set is obtained for network traffic indicated by a network traffic type in an association relationship, for any historical data set, the network device may determine a network traffic type corresponding to the any historical data set. Therefore, the network device may add, to each piece of historical network running data in the any historical data set, a label used to indicate a network traffic type corresponding to the any historical data set. The label of the network traffic type may be a type identifier of the network traffic type. Different network traffic types have different type identifiers, and each type identifier is used to indicate a network traffic type. The type identifier and a manner of adding a label to historical network running data are not limited in this embodiment of this application.

Step 32. The network device inputs historical network running data that carries a network traffic type label into the initial recognition model, and trains the initial recognition model to obtain the network traffic type recognition model.

The initial recognition model may be a neural network model, and the process shown in step 32 may be as follows. The network device initializes a model parameter in the initial recognition model, inputs historical network running data carrying a network traffic type label into the initial recognition model, and trains the initial recognition model a preset quantity of times based on a network transmission characteristic and a type label in each piece of historical network running data and a supervised learning algorithm. For each training, the initial recognition model performs type recognition based on a current model parameter and the network transmission characteristic in each piece of historical network running data to obtain a network traffic type of each piece of historical network running data, determines, based on the network traffic type label carried in each piece of historical network running data, whether the recognized network traffic type of each piece of historical network running data is correct, counts a correct rate of a recognition result at this time, and then updates the current model parameter of the initial recognition model based on the supervised learning algorithm for a next time of training. When the preset quantity of times of training is reached or a correct rate of a recognition result reaches a preset value, the training ends. Because the model parameter of the initial recognition model is updated after each training, after the training ends, the initial recognition model is updated to the network traffic type recognition model. Therefore, the network traffic type recognition model may quickly and accurately recognize, based on input network running data, a network traffic type of the network running data.

It should be noted that, the supervised learning algorithm may be a random forest algorithm, or may be a neural network supervised learning algorithm. The supervised learning algorithm is not limited in this embodiment of this application. In addition, the process shown in steps 1101 to 1104 needs to be performed only once, rather than performed a plurality of times.

1104. The network device obtains network running data corresponding to a first period, where the network running data includes at least one of a network transmission characteristic of the network device in the first period and a first value corresponding to the specified parameter.

A process shown in step 1104 is the same as the process shown in step 401. Herein, the process shown in step 1104 is not described in detail in this embodiment of this application.

1105. The network device inputs the network running data into the network traffic type recognition model.

1106. The network device obtains a first network traffic type, output by the network traffic type recognition model based on the network running data, of the network device in the first period, where a network traffic type is used to indicate a packet transmission status in a preset period.

After the network device inputs the network running data into the network traffic type recognition model, the network traffic type recognition model recognizes, based on a current model parameter and the network transmission characteristic included in the network running data, a network traffic type corresponding to the network transmission characteristic, that is, the first network traffic type in the first period, and output the recognized first network traffic type.

1107. The network device queries the at least one preset association relationship, to obtain a third value, corresponding to the first network traffic type, of the specified parameter.

Because the network device stores the at least one association relationship, the network device may determine the third value, having an association relationship with the first network traffic type, of the specified parameter by querying the at least one stored association relationship.

It should be noted that, when the process shown in step 1107 is performed by the computing device, after completing step 1107, the computing device may send the determined third value, corresponding to the first network traffic type, of the specified parameter to the network device, so that the network device performs the following step 1108.

1108. The network device configures the specified parameter of the network device in a second period to the third value, where the second period is a period after the first period.

Because each network traffic type is used to indicate a packet transmission status in a preset period, the first period and the second period may be considered as preset periods, and the network device may configure the specified parameter in the second period to the third value, corresponding to the first network traffic type, of the specified parameter.

In the method provided in this embodiment of this application, the first network traffic type in the first period is recognized by using the network traffic type recognition model, the third value, corresponding to the first network traffic type, of the specified parameter is determined based on the at least one association relationship, and the third value, corresponding to the first network traffic type, of the specified parameter is configured as a value of the specified parameter in the second period. In this configuration manner, application scenarios are not considered, and parameters do not need to be manually modified or configured. Therefore, this configuration manner is universal. In addition, because each association relationship is used to indicate that a network traffic type corresponds to a third value of the specified parameter, and the third value of the specified parameter is a preferred value of the specified parameter for network traffic indicated by the network traffic type, the specified parameter in the second period is configured to a preferred value of the specified parameter for network traffic indicated by the first network traffic type. Therefore, the network device performs packet transmission in the second period based on the preferred value of the specified parameter, thereby improving packet transmission efficiency, and avoiding transmission congestion.

Figure 12:
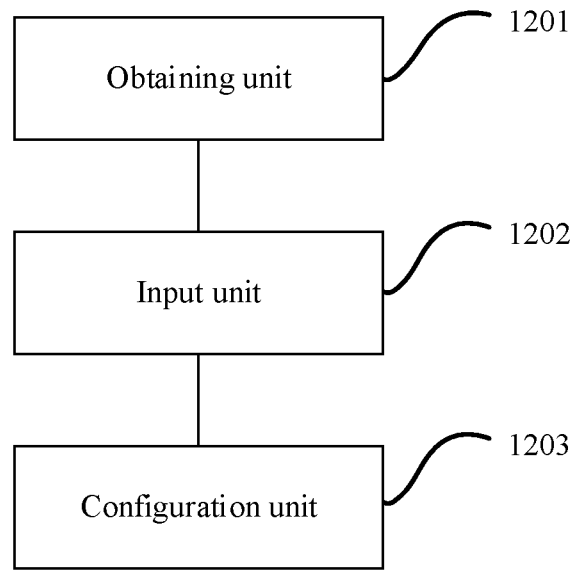
FIG. 12 is a schematic diagram of a structure of a network parameter configuration apparatus according to an embodiment of this application.

FIG. 12 is a schematic diagram of a structure of a network parameter configuration apparatus according to an embodiment of this application. The apparatus includes an obtaining unit 1201 configured to perform step 601, an input unit 1202 configured to perform step 603, where the obtaining unit 1201 is further configured to perform step 604, and a configuration unit 1203 configured to perform step 605.

Optionally, the obtaining unit 1201 is further configured to perform step 24.

Optionally, the obtaining unit 1201 is configured to input the historical network running data corresponding to the at least one historical period and the network running data into the prediction model, and obtain a second value, output by the prediction model based on the historical network running data corresponding to the at least one historical period and the network running data, of the specified parameter, where the at least one historical period is a period before the first period.

Optionally, the apparatus further includes a first training unit configured to input the network running data into an initial prediction model, and train the initial prediction model to obtain the prediction model, or an update unit configured to input the network running data into the prediction model, to obtain an updated prediction model.

Optionally, the apparatus further includes a second training unit, the obtaining unit 1201 is further configured to perform step 24, and the second training unit is configured to input the historical network running data corresponding to the plurality of historical periods into an initial prediction model, and train the initial prediction model to obtain the prediction model.

Optionally, the apparatus further includes a construction unit configured to perform step 21, and an establishment unit configured to perform step 22, where the construction unit is further configured to perform step 23.

Optionally, the network transmission characteristic includes at least one of a quantity of packets buffered by the network device in the first period, packet transmission efficiency information, and an average size of transmitted packets.

Figure 13:
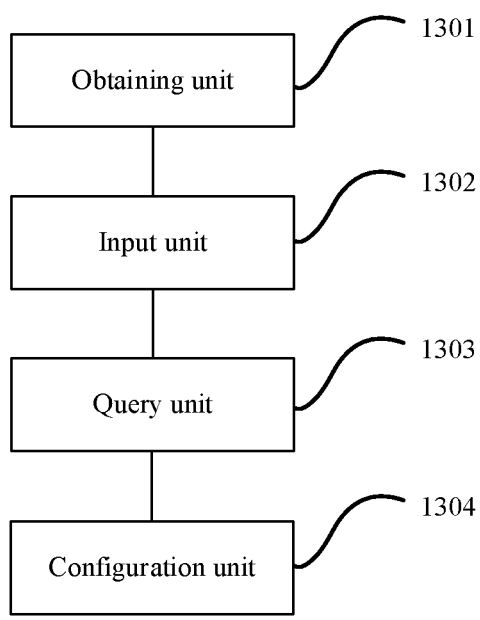
FIG. 13 is a schematic diagram of a structure of a network parameter configuration apparatus according to an embodiment of this application.

FIG. 13 is a schematic diagram of a structure of a network parameter configuration apparatus according to an embodiment of this application. The apparatus includes an obtaining unit 1301 configured to perform step 1104, an input unit 1302 configured to perform step 1105, where the obtaining unit 1301 is configured to perform step 1106, a query unit 1303 configured to perform step 1107, and a configuration unit 1304 configured to perform step 1108.

Optionally, the apparatus further includes an establishment unit configured to perform step 1101, where the obtaining unit 1301 is further configured to perform step 1102, and the obtaining unit 1301 is further configured to perform step 1103.

Optionally, the obtaining unit 1301 is further configured to perform steps 31 and 32.

All of the foregoing optional technical solutions may form optional embodiments of this disclosure through any combination. Details are not described herein again.

It should be noted that, when the network parameter configuration apparatus provided in the foregoing embodiment performs network parameter configuration, division into the foregoing functional modules is merely used as an example for description. In actual application, the functions may be allocated, as required, to different functional modules for implementation, that is, an internal structure of the apparatus is divided into different functional modules to implement all or a part of the functions described above. In addition, the apparatus provided in the foregoing embodiment and the network parameter configuration method embodiments pertain to a same idea. For an implementation process of the apparatus, refer to the method embodiments. Details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely example embodiments of this application, but are not intended to limit this application. Any modification, equivalent replacement, or improvement made without departing from the principle of this application should fall within the protection scope of this application.

What is claimed is:

1. A method implemented by a network device, wherein the method comprises:
obtaining, by a parameter calculation circuit of the network device, network running data, wherein the network running data is a characteristic of packet transmission of the network device;
inputting, by the parameter calculation circuit, the network running data into a prediction model;
obtaining, by the parameter calculation circuit, a configuration value, output by the prediction model based on the network running data, of a specified parameter, wherein the specified parameter comprises an explicit congestion notification (ECN) parameter, and wherein the ECN parameter is used to set an ECN flag for a packet forwarded by the network device;
sending, by the parameter calculation circuit, the configuration value;
receiving, by a forwarding chip of the network device, the configuration value from the parameter calculation circuit; and
configuring the specified parameter of the network device to the configuration value in response to receiving the configuration value.

2. The method of claim 1, further comprising inputting the network running data into the prediction model to obtain an updated prediction model.

3. The method of claim 1, wherein the network running data comprises a bandwidth utilization, and wherein the method further comprises:
- constructing a configuration space comprising at least one association relationship, wherein each of the at least one association relationship is used to indicates a value corresponding to the specified parameter;
- establishing a first reward relationship and a second reward relationship, wherein the first reward relationship is used to indicate impact, on network transmission performance, of a quantity of packets buffered by the network device, and the second reward relationship is used to indicate impact of the bandwidth utilization of the network device on network transmission performance; and
- constructing an initial prediction model based on the configuration space, the first reward relationship, and the second reward relationship.

4. The method of claim 1, wherein the network running data comprises at least one of bandwidth utilization, a buffered packet quantity, or a normalized value of the buffered packet quantity.

5. A network parameter configuration apparatus, comprising:
- a parameter calculation circuit configured to:
  - obtain network running data, wherein the network running data is a characteristic of packet transmission of the network parameter configuration apparatus;
  - input the network running data into a prediction model;
  - obtain a configuration value, output by the prediction model based on the network running data, of a specified parameter, wherein the specified parameter comprises an explicit congestion notification (ECN) parameter, wherein the ECN parameter is used to set an ECN flag for a packet forwarded by the network parameter configuration apparatus; and
  - send the configuration value; and
- a forwarding chip coupled to the parameter calculation circuit and configured to:
  - receive the configuration value from the parameter calculation circuit; and
  - configure the specified parameter of the network parameter configuration apparatus to the configuration value in response to receiving the configuration value.

6. The network parameter configuration apparatus of claim 5, wherein the parameter calculation circuit is further configured to further input the network running data into the prediction model to obtain an updated prediction model.

7. The network parameter configuration apparatus of claim 5, wherein the parameter calculation circuit is further configured to:
- construct a configuration space comprising at least one association relationship, wherein each of the at least one association relationship indicates a value corresponding to the specified parameter;
- establish a first reward relationship and a second reward relationship, wherein the first reward relationship is used to indicate impact, on network transmission performance, of a quantity of packets buffered by the network parameter configuration apparatus, and the second reward relationship is used to indicate impact of bandwidth utilization of the network parameter configuration apparatus on network transmission performance; and
- construct an initial prediction model based on the configuration space, the first reward relationship, and the second reward relationship.

8. The network parameter configuration apparatus of claim 5, wherein the network running data comprises at least one of bandwidth utilization, a buffered packet quantity, or a normalized value of the buffered packet quantity.

9. The method of claim 1, wherein the ECN parameter comprises at least one of a first threshold indicating a first quantity of packets buffered, a second threshold indicating a second quantity of packets buffered, or a mark probability threshold, and wherein the first threshold is less than the second threshold.

10. The method of claim 1, wherein the forwarding chip is configured to obtain collected data of the network device.

11. A non-transitory computer-readable storage medium comprising computer executable instructions and that, when executed by a processor, cause a network parameter configuration apparatus to:
- obtain, by a parameter calculation circuit of the network parameter configuration apparatus, network running data, wherein the network running data is a characteristic of packet transmission of the network parameter configuration apparatus;
- input, by the parameter calculation circuit, the network running data into a prediction model;
- obtain, by the parameter calculation circuit, a configuration value, output by the prediction model based on the network running data, of a specified parameter, wherein the specified parameter comprises an explicit congestion notification (ECN) parameter, and wherein the ECN parameter is used to set an ECN flag for a packet forwarded by the network parameter configuration apparatus;
- send, by the parameter calculation circuit, the configuration value;
- receive, by a forwarding chip of the network parameter configuration apparatus, the configuration value from the parameter calculation circuit; and
- configure the specified parameter of the network parameter configuration apparatus to the configuration value in response to receiving the configuration value.

12. The non-transitory computer-readable storage medium of claim 11, wherein the computer executable instructions further cause the network parameter configuration apparatus to input the network running data into the prediction model to obtain an updated prediction model.

13. The non-transitory computer-readable storage medium of claim 11, wherein the ECN parameter comprises at least one of a first threshold indicating a first quantity of packets buffered, a second threshold indicating a second quantity of packets buffered, or a mark probability threshold, and wherein the first threshold is less than the second threshold.

14. The non-transitory computer-readable storage medium of claim 11, wherein the forwarding chip is configured to obtain collected data of the network device.

15. The network parameter configuration apparatus of claim 5, wherein the ECN parameter comprises at least one of a first threshold indicating a first quantity of packets buffered, a second threshold indicating a second quantity of packets buffered, or a mark probability threshold, and wherein the first threshold is less than the second threshold.

16. The network parameter configuration apparatus of claim 5, wherein the parameter calculation circuit comprises one or more of a field programmable gate array, a central processing unit, a network processor, or an artificial intelligence chip of the network parameter configuration apparatus.

17. The method of claim 1, wherein the parameter calculation circuit comprises one of a field programmable gate array, a central processing unit, a network processor, or an artificial intelligence chip of the network device.

* * * * *

UNITED STATES PATENT AND TRADEMARK OFFICE
CERTIFICATE OF CORRECTION

PATENT NO.         : 12,335,106 B2
APPLICATION NO.    : 17/695271
DATED              : June 17, 2025
INVENTOR(S)        : Siyu Yan et al.

Page 1 of 1

It is certified that error appears in the above-identified patent and that said Letters Patent is hereby corrected as shown below:

In the Claims

Claim 3, Column 27, Line 6: "relationship is used to indicates a" should read "relationship indicates a"

Signed and Sealed this
Twenty-second Day of July, 2025

Coke Morgan Stewart
*Acting Director of the United States Patent and Trademark Office*